United States Patent
Klein et al.

(10) Patent No.: US 10,836,467 B2
(45) Date of Patent: Nov. 17, 2020

(54) TILT-ROTOR MULTICOPTERS WITH VARIABLE PITCH PROPELLERS

(71) Applicant: Sanmina Corporation, San Jose, CA (US)

(72) Inventors: Max Edward Klein, Huntsville, AL (US); Walter Thomas Castleberry, Hampton Cove, AL (US); Nathan Trey McFerrin, Huntsville, AL (US)

(73) Assignee: Sanmina Corporation, San Jose, CA (US)

( * ) Notice: Subject to any disclaimer, the term of this patent is extended or adjusted under 35 U.S.C. 154(b) by 0 days.

(21) Appl. No.: 16/004,316

(22) Filed: Jun. 8, 2018

(65) Prior Publication Data

US 2018/0362146 A1  Dec. 20, 2018

Related U.S. Application Data

(60) Provisional application No. 62/519,805, filed on Jun. 14, 2017.

(51) Int. Cl.
*B64C 11/34* (2006.01)
*B64C 27/52* (2006.01)
(Continued)

(52) U.S. Cl.
CPC ............ *B64C 11/34* (2013.01); *B64C 11/305* (2013.01); *B64C 27/08* (2013.01); *B64C 27/52* (2013.01);
(Continued)

(58) Field of Classification Search
CPC ......... B64C 11/34; B64C 27/52; B64C 27/08; B64C 11/305; B64C 27/80; B64C 39/024;
(Continued)

(56) References Cited

U.S. PATENT DOCUMENTS 2,686,019 A * 8/1954 Shapiro .................. B64C 27/80
244/17.23
3,572,612 A * 3/1971 Irbitis ................. B64C 29/0033
244/7 C
(Continued)

FOREIGN PATENT DOCUMENTS

EP           2990332 A1    3/2016
KR     20170135577 A  * 12/2017
(Continued)

OTHER PUBLICATIONS

PCT/US2018/036979. International Search Report & Written Opinion (dated Nov. 8, 2018).

*Primary Examiner* — Genna M Mott
(74) *Attorney, Agent, or Firm* — Julio Loza; Tyler Barrett; Loza & Loza, LLP

(57) ABSTRACT

Aircraft are configured to facilitate propeller blade pitch adjustability. According to one example, an aircraft can include a plurality of propellers, where each propeller includes plurality of blades. At least one pitch adjust mechanism may be associated with at least on propeller, where the pitch adjust mechanism is configured to adjust a pitch of the plurality of blades for at least one propeller in response to airflow from at least one other propeller influencing an airflow at the at least one propeller. Other aspects, embodiments, and features are also included.

20 Claims, 15 Drawing Sheets

(51) Int. Cl.
*B64C 11/30* (2006.01)
*B64C 39/02* (2006.01)
*B64C 27/80* (2006.01)
*B64C 27/08* (2006.01)
*B64C 27/605* (2006.01)

(52) U.S. Cl.
CPC ............ *B64C 27/605* (2013.01); *B64C 27/80* (2013.01); *B64C 39/024* (2013.01); *B64C 2201/027* (2013.01); *B64C 2201/108* (2013.01); *B64C 2203/00* (2013.01)

(58) Field of Classification Search
CPC ............... B64C 11/46; B64C 2201/024; B64C 2201/108
See application file for complete search history.

(56) References Cited

U.S. PATENT DOCUMENTS

| | | | |
|---|---|---|---|
| 6,478,262 B1* | 11/2002 | Kinkead | B64C 27/20 244/17.13 |
| 9,665,094 B1* | 5/2017 | Russell | G05D 1/00 |
| 2003/0094537 A1* | 5/2003 | Austen-Brown | B64C 27/28 244/7 R |
| 2006/0269414 A1* | 11/2006 | Palcic | B64C 27/10 416/170 R |
| 2016/0032895 A1* | 2/2016 | Weddendorf | F03D 5/00 244/17.23 |
| 2017/0015412 A1* | 1/2017 | Matus | B64C 27/52 |
| 2018/0002026 A1* | 1/2018 | Oldroyd | B64C 11/46 |
| 2018/0002027 A1* | 1/2018 | McCullough | B64D 31/10 |
| 2018/0155019 A1* | 6/2018 | Lee | B64C 29/0033 |

FOREIGN PATENT DOCUMENTS

RU 2547950 C1 4/2015
WO 2014007883 A1 1/2014

* cited by examiner

TILT-ROTOR MULTICOPTERS WITH VARIABLE PITCH PROPELLERS

PRIORITY CLAIM

The present Application for Patent claims priority to Provisional Application No. 62/519,805 entitled "Tilt-Rotor Multicopters with Variable Pitch Propellers" filed Jun. 14, 2017, and assigned to the assignee hereof and hereby expressly incorporated by reference herein in its entirety.

TECHNICAL FIELD

The technology discussed below relates generally to aerial vehicles, and more specifically to aerial vehicles with a plurality of rotors.

BACKGROUND

A multirotor or multicopter is a rotorcraft with more than two rotors. An advantage of multicopter aircraft is the simpler rotor mechanics required for flight control. In typical multicopters, control of vehicle motion is achieved by varying the relative speed of each rotor to change the thrust and torque produced by each.

Due to their ease of both construction and control, multicopter aircraft are frequently used in radio control aircraft and unmanned aerial vehicle (UAV) projects in which the names tricopter, quadcopter, hexacopter and octocopter are frequently used to refer to 3-rotor, 4-rotor, 6-rotor, and 8-rotor helicopters, respectively. In order to allow more power and stability at reduced weight coaxial rotors can be employed, in which each arm has two motors.

Features and systems that can improve the operation of multicopter aircraft are generally desirable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate multicopter aircraft enabled to achieve relatively high speeds in one mode of operation, and relatively high hovering efficiency capable of heavy lifting in another mode of operation. According to one or more aspects of the disclosure, multicopter aircraft are provided. At least one embodiment of such multicopter aircraft may include a plurality of propellers, where each propeller includes a plurality of blades. At least one pitch adjust mechanism may be associated with at least one propeller. The at least one pitch adjust mechanism may be configured to adjust a pitch of the plurality of blades for at least one propeller in response to airflow from at least one other propeller influencing an airflow at the at least one propeller.

Additional aspects of the present disclosure include methods operational on an aircraft. According to at least one implementation, such methods may include setting a speed for a plurality of propellers, where each propeller includes a plurality of blades. A pitch of the plurality of blades for at least one propeller may be adjusted in response to airflow from at least one other propeller influencing an airflow at the at least one propeller.

Still further aspects of the present disclosure include processor-readable storage mediums. According to at least one embodiment, such a processor-readable storage medium may store processor-executable programming for causing a processing circuit to set a speed for a plurality of propellers, where each propeller includes a plurality of blades. The processor-readable storage medium may further store processor-executable programming for causing a processing circuit to adjust a pitch of the plurality of blades for at least one propeller in response to airflow from at least one other propeller influencing an airflow at the at least one propeller.

Other aspects, features, and embodiments associated with the present disclosure will become apparent to those of ordinary skill in the art upon reviewing the following description in conjunction with the accompanying figures.

DRAWINGS

Figure 6:
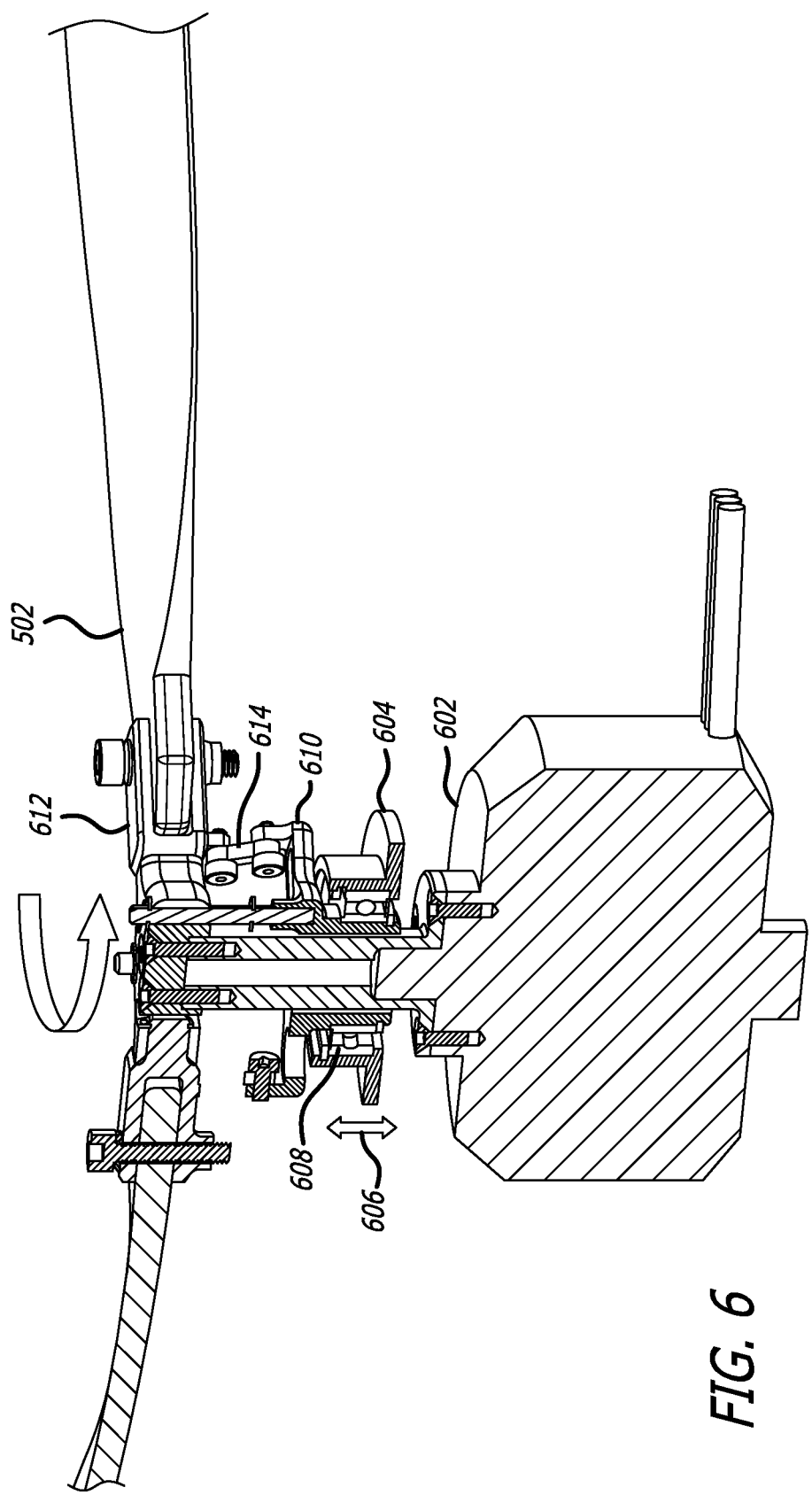
Figure 7:
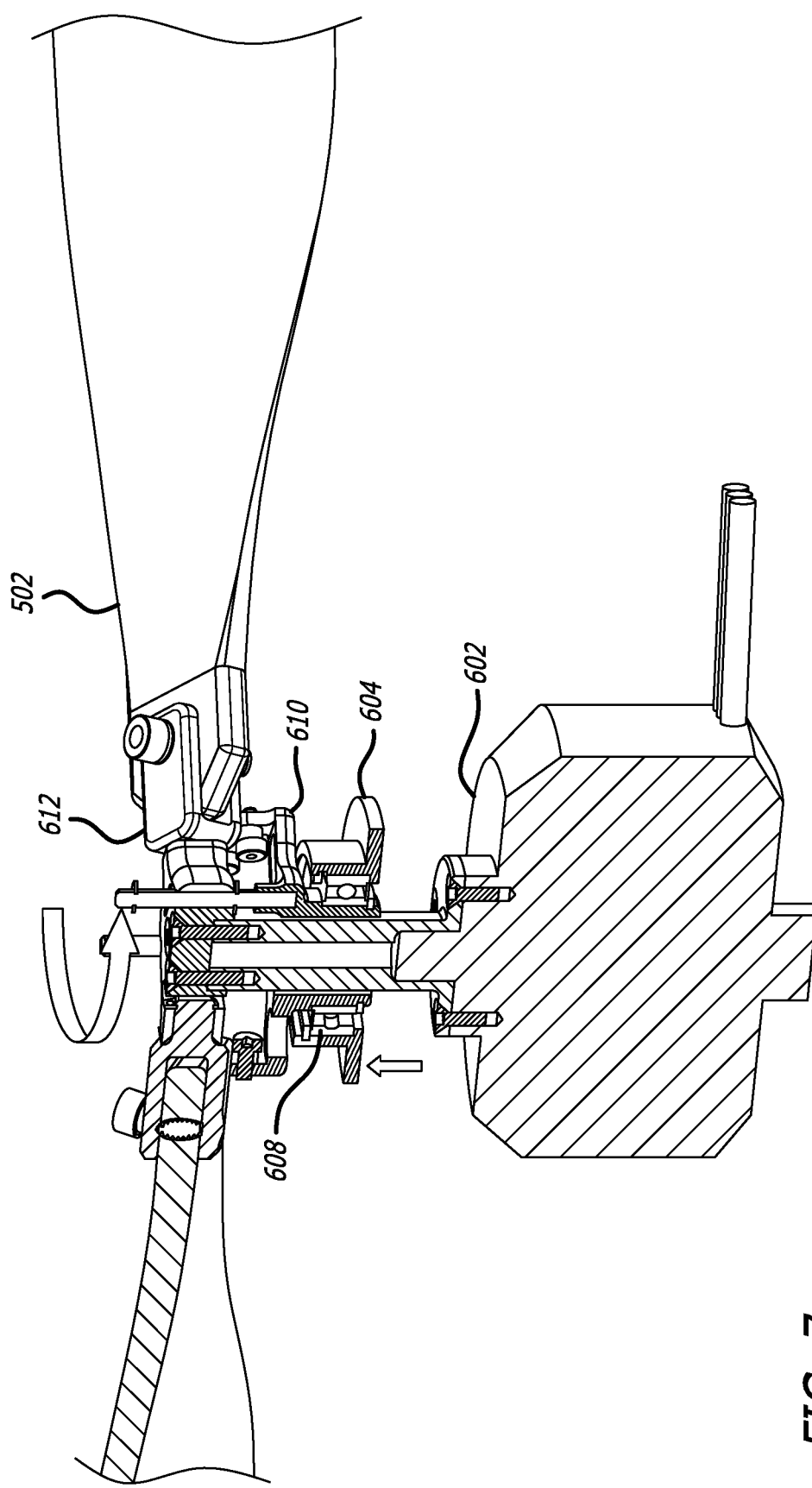

FIG. 6 is a cross-sectioned isometric view of a propeller with an example of a mechanism for varying the pitch of the propeller blades according to at least one embodiment with the blades in a lowest angle of attack position FIG. 7 is a cross-sectioned isometric view of a propeller with an example of a mechanism for varying the pitch of the propeller blades according to at least one embodiment with the blades in a highest angle of attack position.

Figure 8:
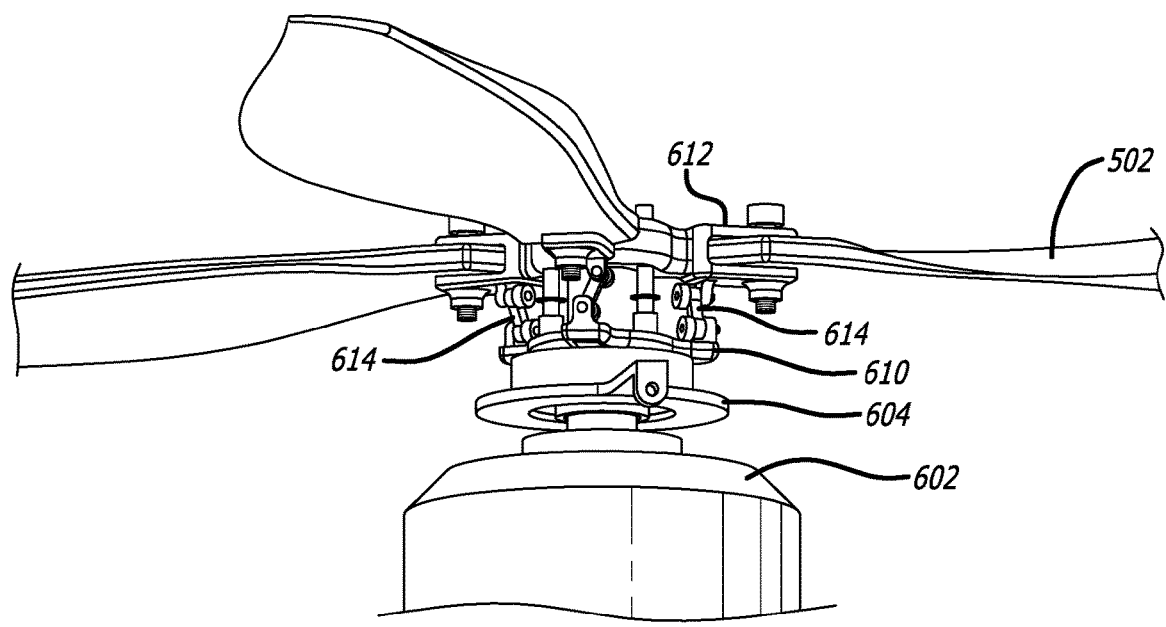

FIG. 8 is an isometric view of a propeller with an example of a mechanism for varying the pitch of the propeller blades according to at least one embodiment with the blades in a lowest angle of attack position.

Figure 9:
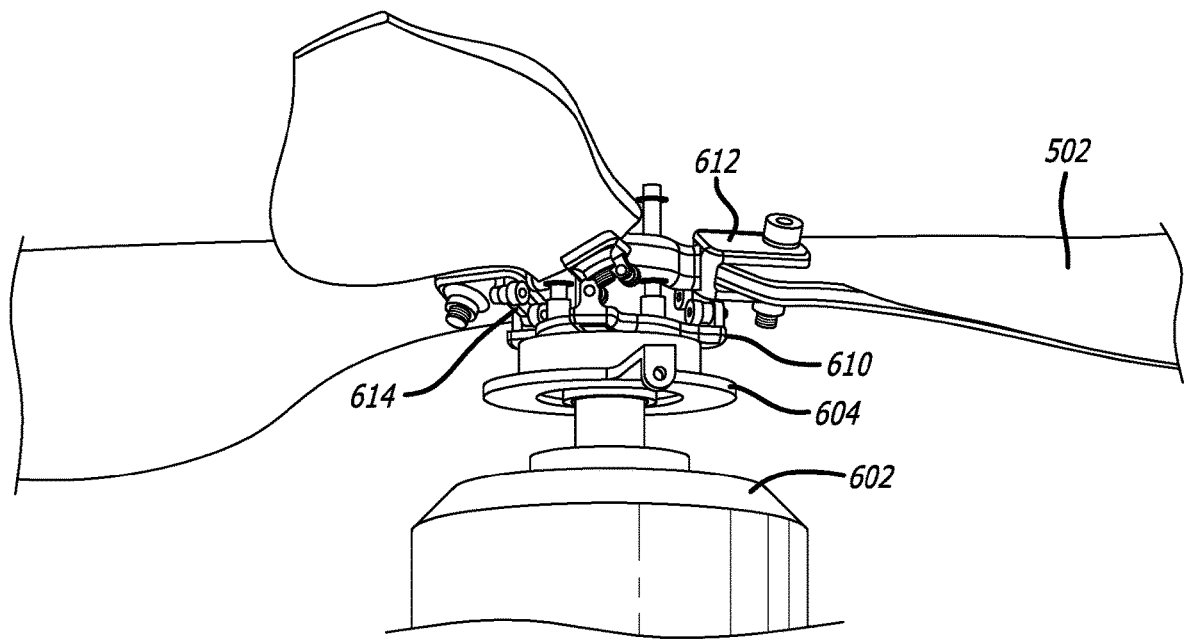

FIG. 9 is an isometric view of a propeller with an example of a mechanism for varying the pitch of the propeller blades according to at least one embodiment with the blades in a highest angle of attack position.

Figure 1:
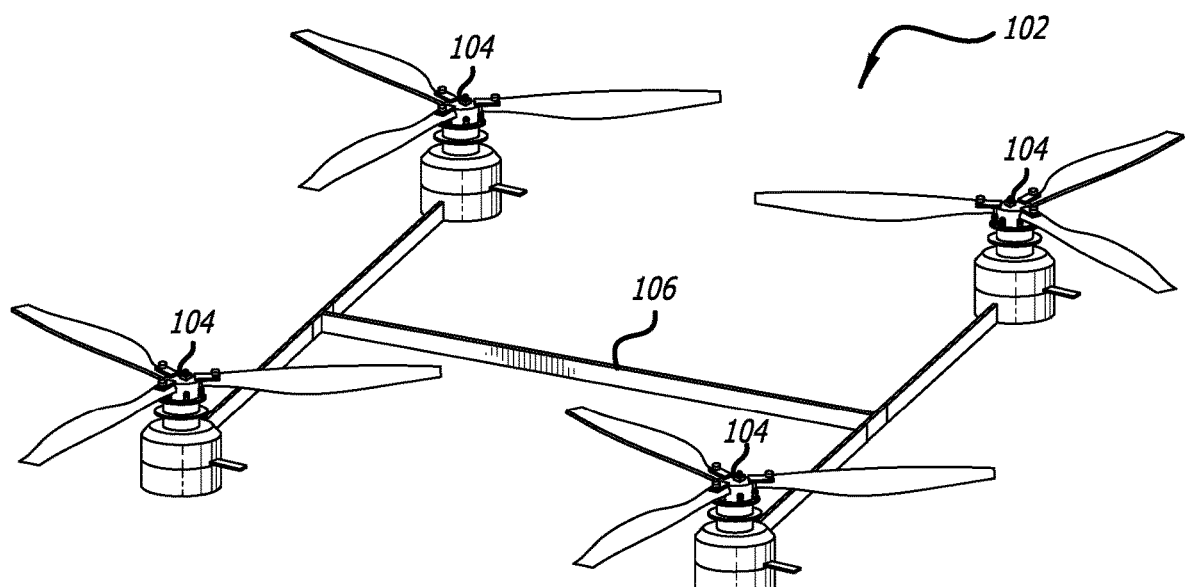
FIG. 1 is an isometric view of a simplified multicopter aircraft according to at least one example of the present disclosure.
Figure 10:
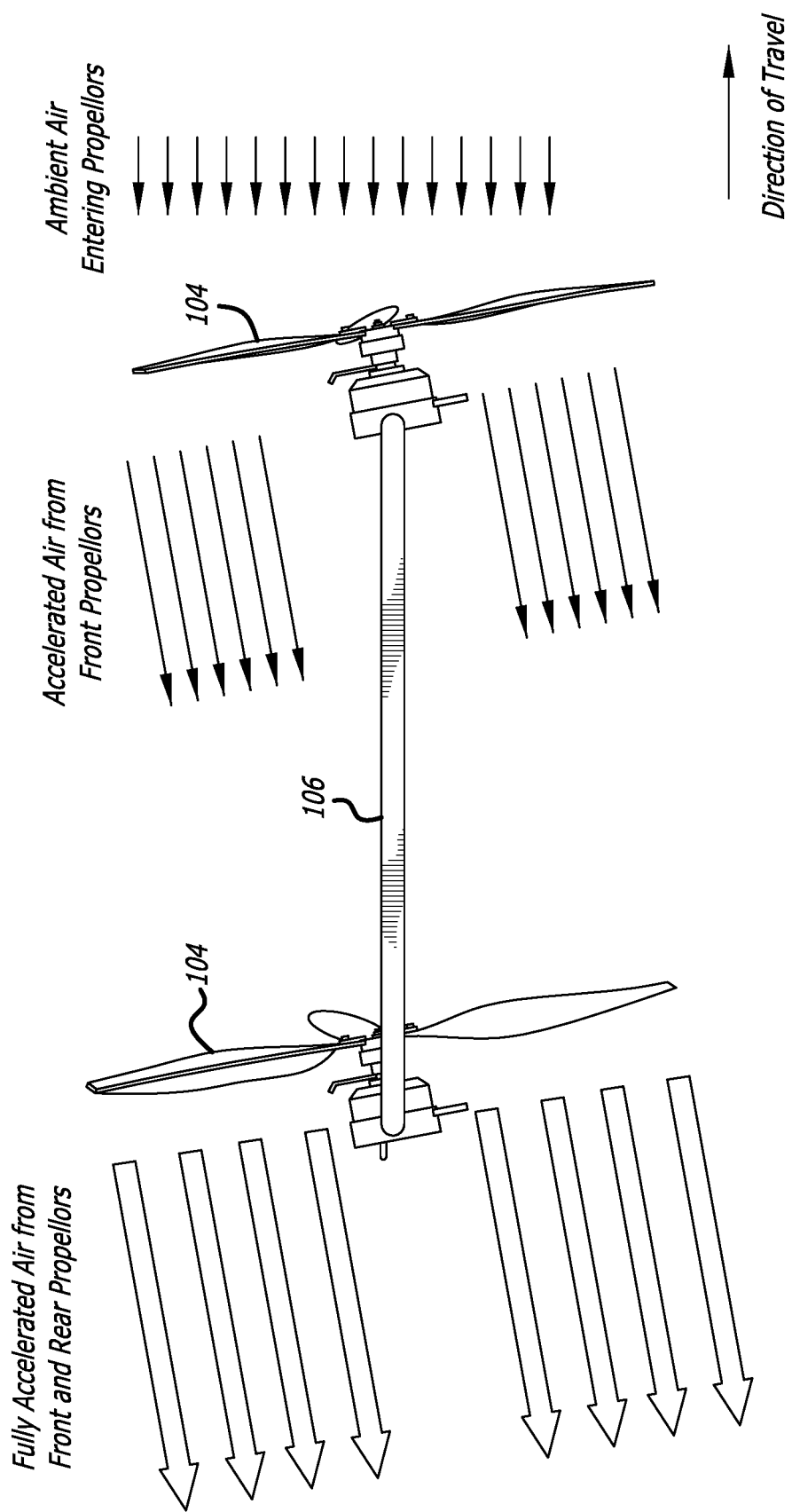

FIG. 10 is a side view of the multicopter aircraft in FIG. 1 with the propellers tilted to provide maximum thrust for forward motion and depicting variations in air velocity between fore and aft propellers.

Figure 11:
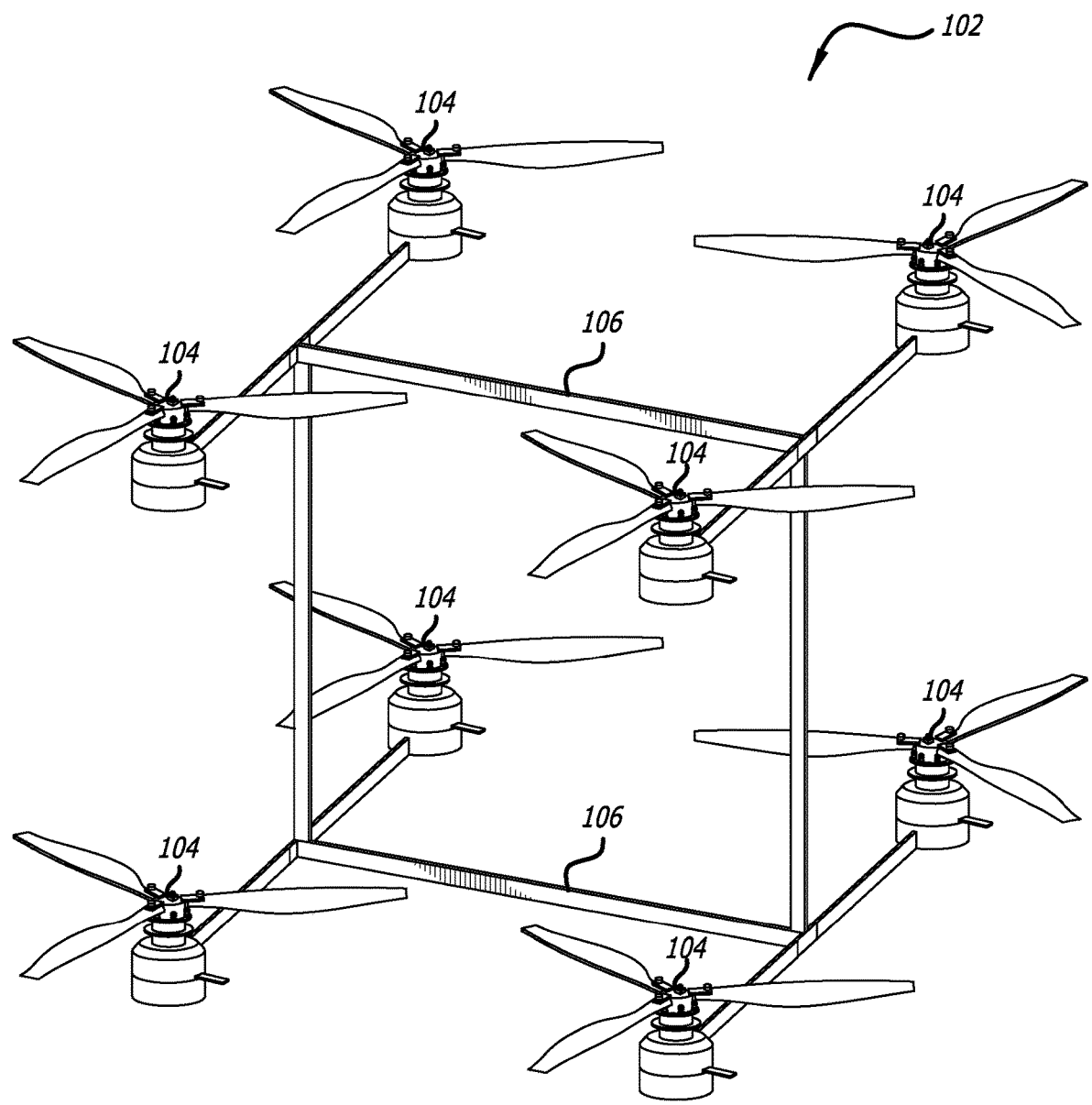

FIG. 11 is an isometric view of a simplified multicopter aircraft according to at least one example of the present disclosure.

Figure 12:
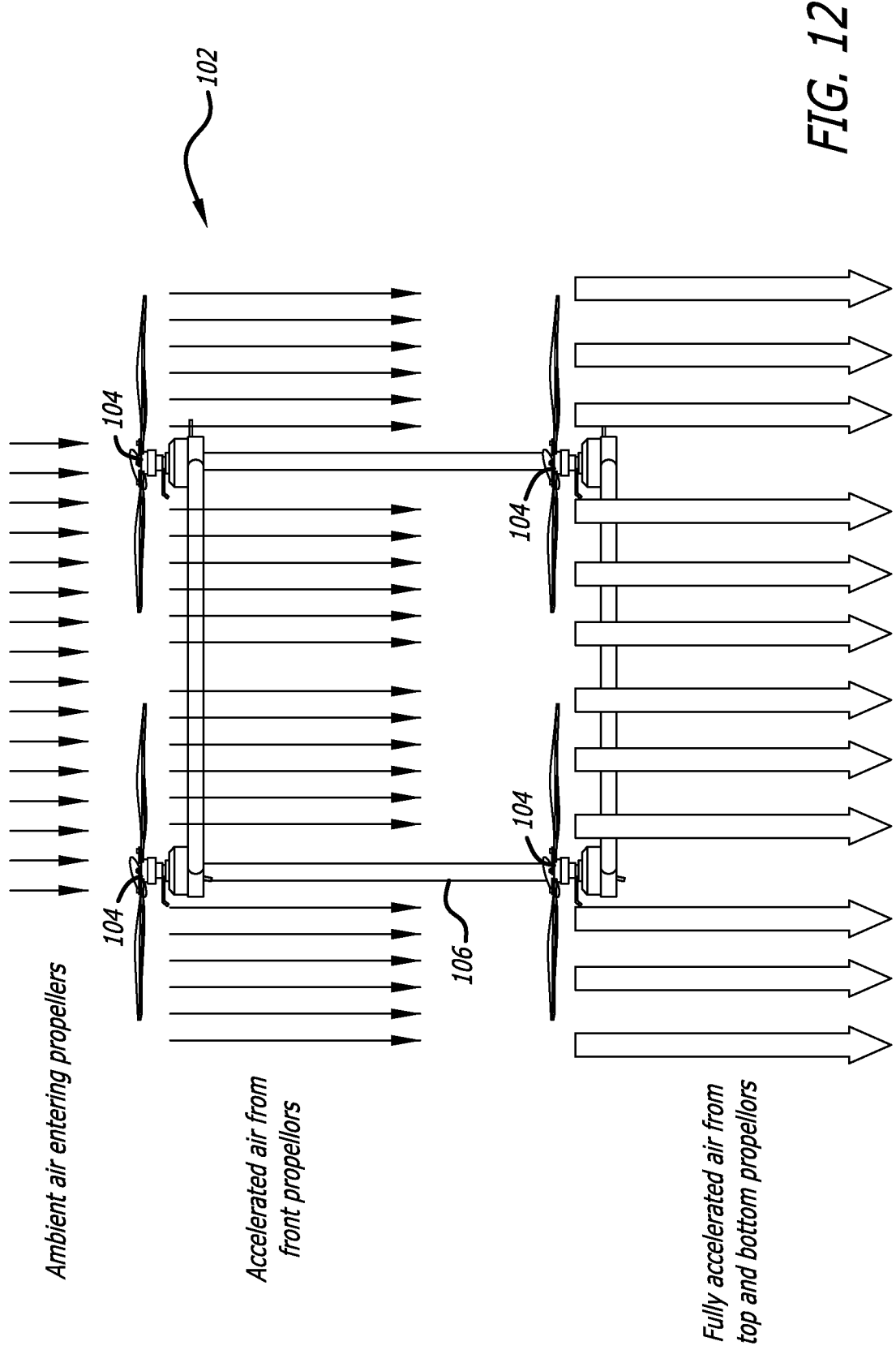

FIG. 12 is a side view of the multicopter aircraft in FIG. 11 depicting variations in air velocity between top and bottom propellers when hovering.

Figure 13:
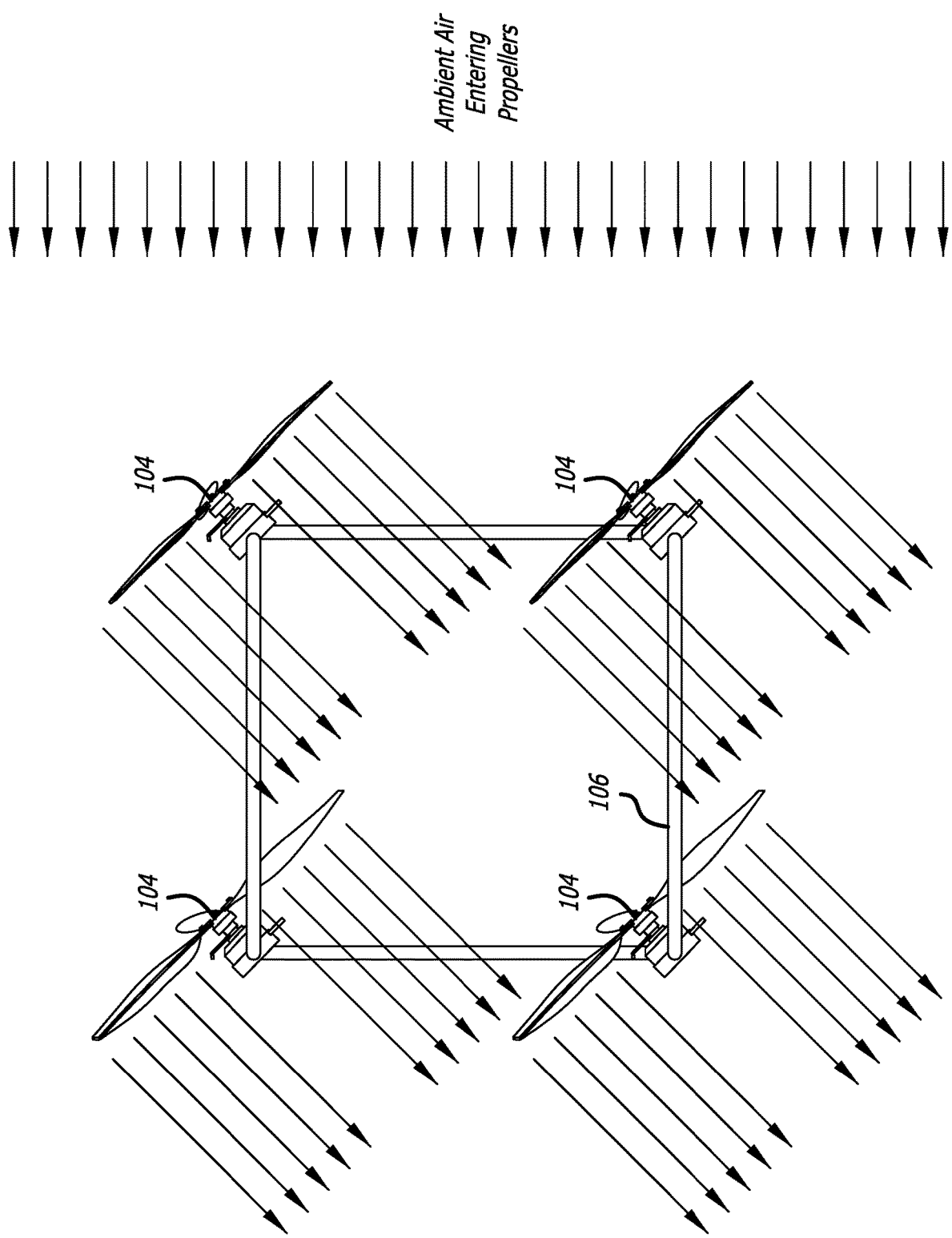

FIG. 13 is a side view of the multicopter aircraft in FIG. 11 depicting air velocity directions when the propellers are tilted about 45 degrees.

Figure 14:
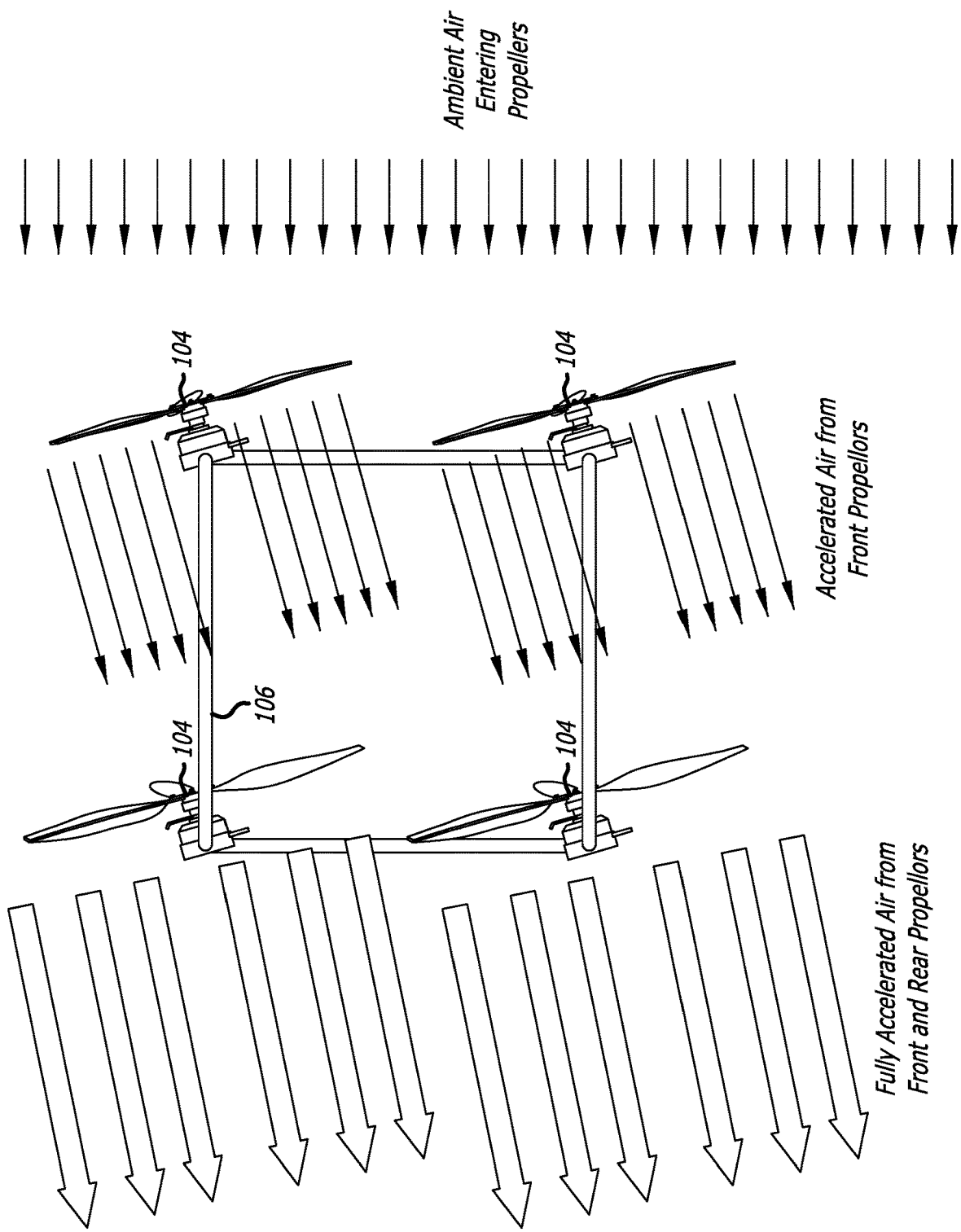

FIG. 14 is a side view of the multicopter aircraft in FIG. 11 with the propellers tilted to provide maximum thrust for forward motion and depicting variations in air velocity between fore and aft propellers.

Figure 15:
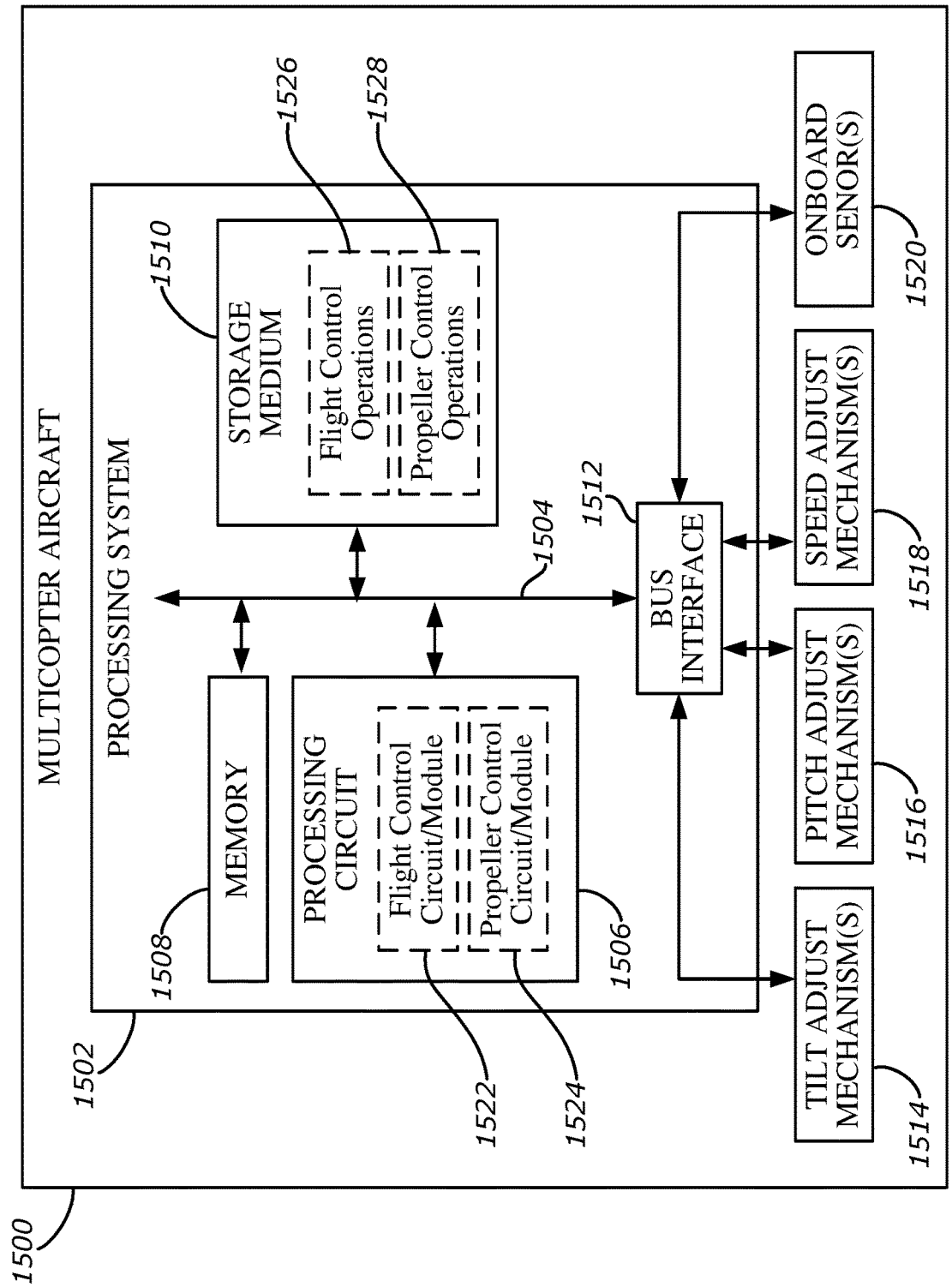

FIG. 15 is a block diagram illustrating select components of a multicopter aircraft employing a processing system according to at least one example of the present disclosure.

Figure 16:
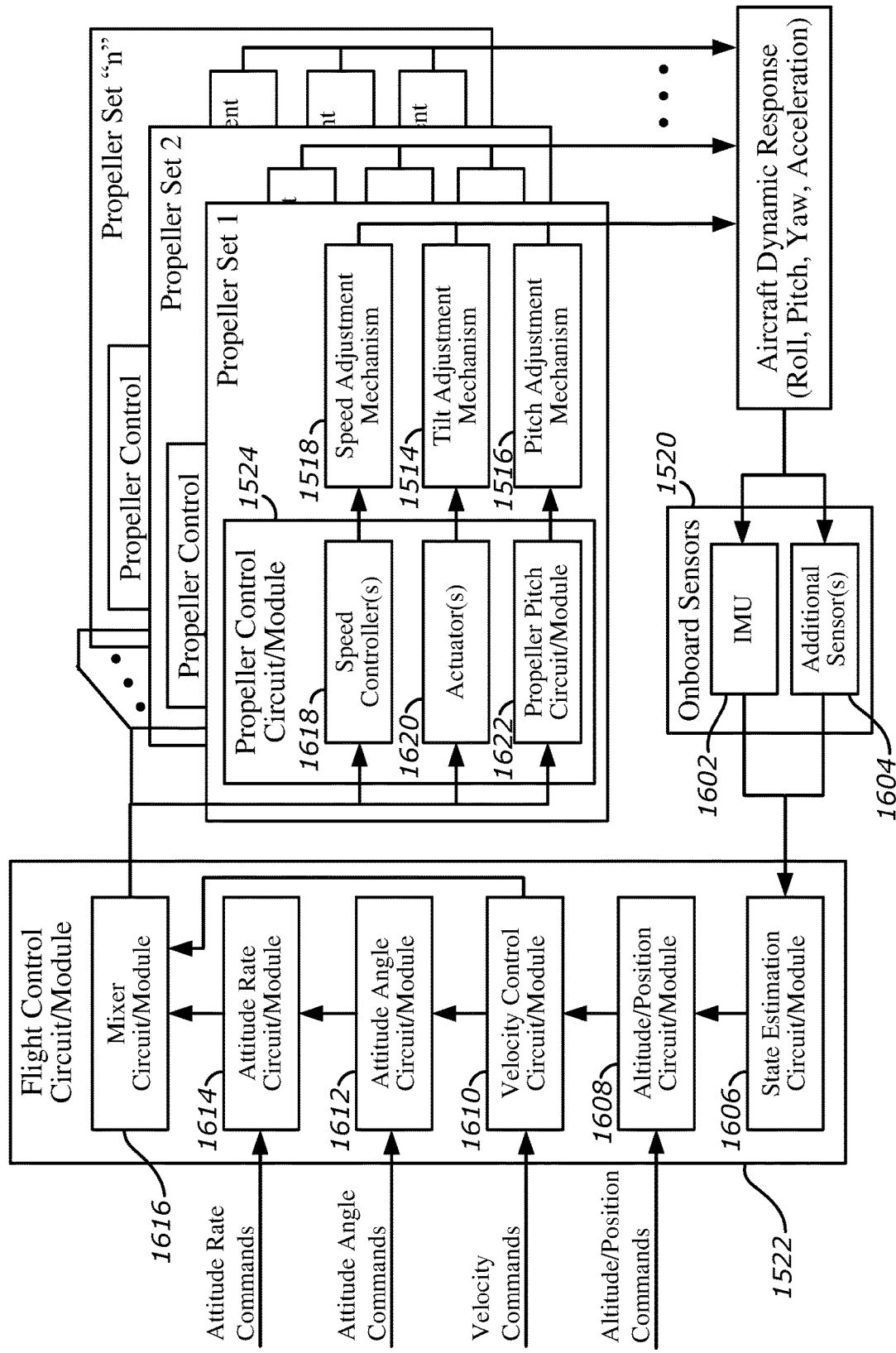

FIG. 16 is a block diagram illustrating at least some logic associated with the multicopter aircraft of FIG. 15 for controlling various aspects of the propellers according to at least one example.

Figure 17:
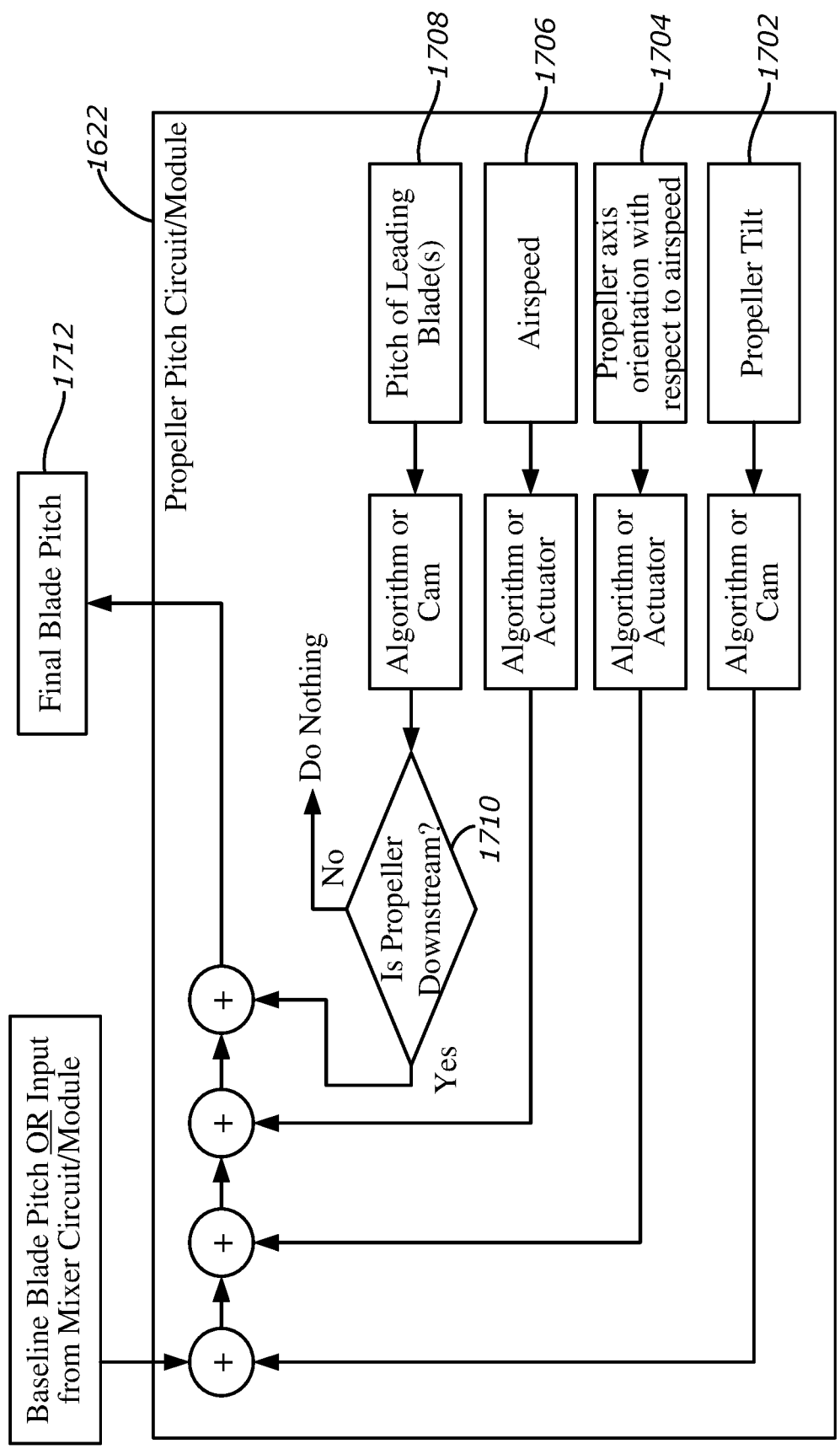

FIG. 17 is a block diagram illustrating at least some logic that may be associated with the propeller pitch circuit/module to control blade pitch according to at least one example.

Figure 18:
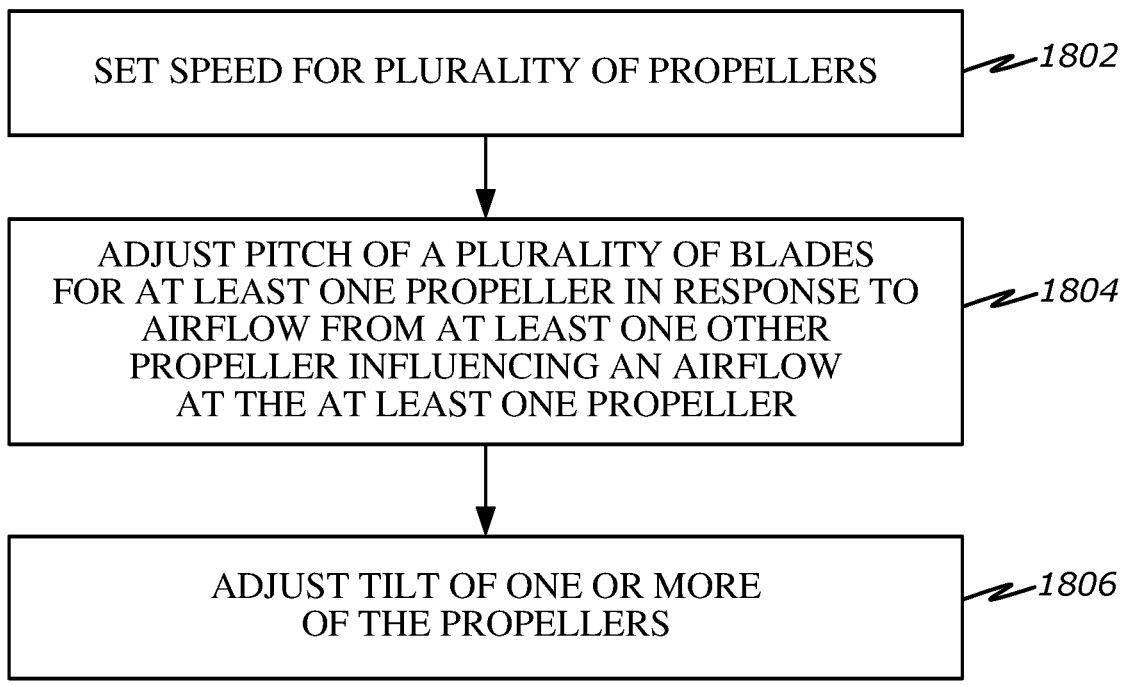

FIG. 18 is a flow diagram depicting a method operational on an aircraft according to at least one implementation of the present disclosure.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The illustrations presented herein are, in some instances, not actual views of any particular multicopter aircraft, propellers, or other specific components of a multicopter aircraft, but are merely idealized representations which are employed to describe the present disclosure. Additionally, elements common between figures may retain the same numerical designation.

Referring to FIG. 1, an example of a simplified multicopter aircraft 102 is depicted according to at least one example. Generally, the multicopter aircraft 102 includes a plurality of rotors or propellers 104 coupled to a frame 106. Each propeller 104 may be operably coupled with a motor to spin the propellers 104 in a manner to generate thrust. In some embodiments, a respective motor may be coupled to each respective propeller 104. In other embodiments, a motor may be coupled to more than one propeller 104. Although the frame 106 in FIG. 1 is relatively simple, it should be understood that various embodiments of the present disclosure may employ a plurality of differently shaped and sized frames. In some embodiments, a lift surface (not shown) may be coupled to the frame 106. Such a lift surface may include, by way of example and not limitation, an airfoil configured to provide lift to the multicopter aircraft 102 when the multicopter aircraft 102 is moving with a positive forward airspeed.

Figure 2:
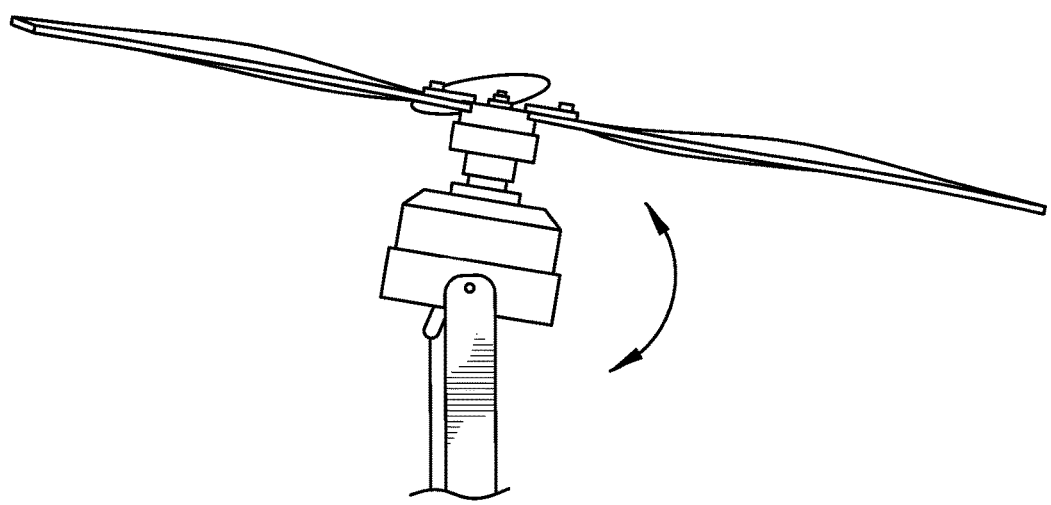
FIG. 2 is a side view of a tilt-rotor according to at least one example of the present disclosure.

According to an aspect of the present disclosure, the propellers 104 may be configured to tilt, as depicted in FIG. 2. That is, a multicopter aircraft 102 of the present disclosure may include one or more mechanisms to adjust the tilt of the individual propellers 104 and/or sets of propellers 104 relative to the frame 106 (e.g., tilt adjust mechanism(s) 1514 described herein with reference to FIG. 15). Various configurations for tilt adjust mechanisms may be employed to vary the tilt of each propeller 104 and/or sets of propellers 104. By way of example and not limitation, such tilt adjust mechanisms may include a servo motor, a linkage system, a hydraulic piston, etc. The ability to adjust the tilt of the propellers 104 can provide the ability to control the pitch of the multicopter aircraft 102 independently of propeller thrust vectors. Since the required thrust vectors are dependent on flight condition (velocity, acceleration, payload mass, wind, etc), this ability effectively allows the decoupling of the multicopter aircraft's 102 pitch from flight condition. The ability to control the pitch in this manner provides, among other benefits, flexibility to orient payload(s) at a desired pitch with respect to the nadir direction and/or a desired position with respect to the propellers 104, the ability to reduce drag by keeping the frame 106 and payloads at an optimum pitch for drag, and the ability to control the angle of optional lifting surfaces. Also, optionally, the magnitude of tilt may vary between individual propellers 104 and/or sets of propellers 104, providing opportunities to maximize efficiency and performance of the overall multicopter aircraft 102. This flexibility also allows the pitch of each propeller 104 to be optimized for its local flow field as influenced by the other propellers 104 on the multicopter aircraft 102.

In some embodiments, the propellers 104 may be configured to tilt along a single axis, typically to facilitate forward and backward movement. In other embodiments, the propellers 104 may be configured to tilt along a plurality of axes, to facilitate forward and backward movement, as well as sideways movement of the multicopter aircraft 102. For example, the propellers 104 may be mounted on a ball joint to enable a range of tilt axes, which can facilitate increased maneuverability of the multicopter aircraft 102.

Figure 3:
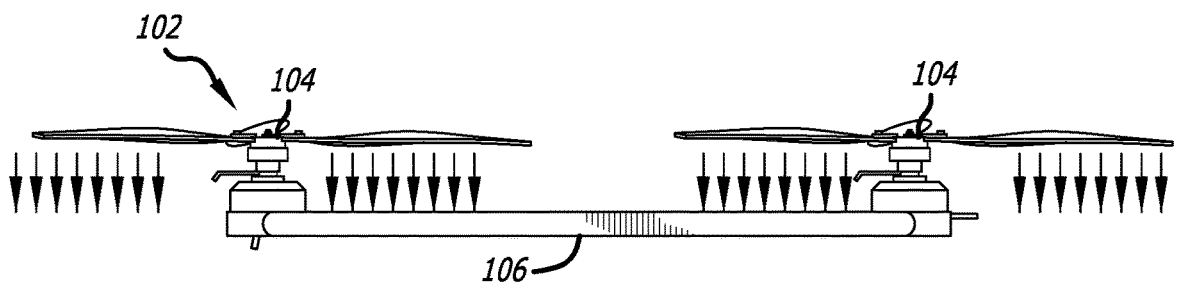
FIG. 3 is a side view depicting an example of the simplified multicopter aircraft of FIG. 1 with the tilt of the propellers adjusted for optimized hovering.

FIG. 3 is a side view depicting an example of the multicopter aircraft 102 with the tilt of the propellers 104 adjusted for optimized hovering. In this example, the tilt of the propellers 104 is set so the axis of rotation of the propellers 104 is at least substantially perpendicular to the ground over which the multicopter aircraft 102 is hovering. As also depicted, the airflow from the propellers 104 is at least substantially in the same direction as the axis of rotation, as indicated by the arrows below the propellers 104.

Figure 4:
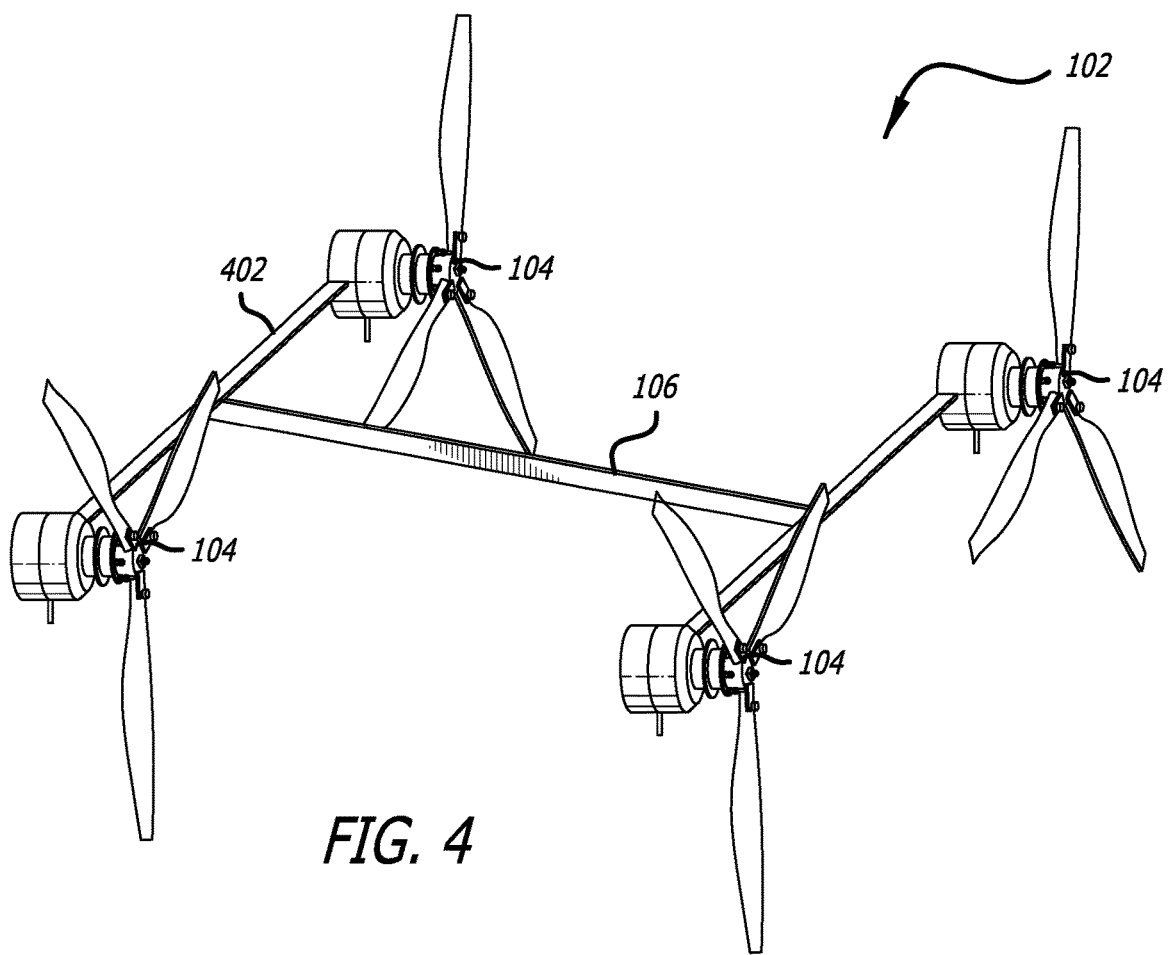
FIG. 4 is an isometric view of the simplified multicopter aircraft of FIG. 1 with the tilt of the propellers adjusted for optimizing forward travel.

FIG. 4 is an isometric view of the multicopter aircraft 102 with the tilt of the propellers 104 adjusted for optimizing forward travel. In this example, the tilt of the propellers 104 is set so the axis of rotation of the propellers 104 is at or nearly parallel to the direction the multicopter aircraft 102 is traveling. As shown, the frame can include mounting arms 402 with more than one propeller 104 coupled thereto. In this example, the mounting arm 402 rotates to adjust the tilt of the propellers 104 coupled to the mounting arm 402.

Although FIGS. 3 and 4 show tilts at the extremes, one or more embodiments of multicopter aircraft 102 of the present disclosure can utilize any tilt angle to which the propellers 104 are configured to tilt.

Figure 5:
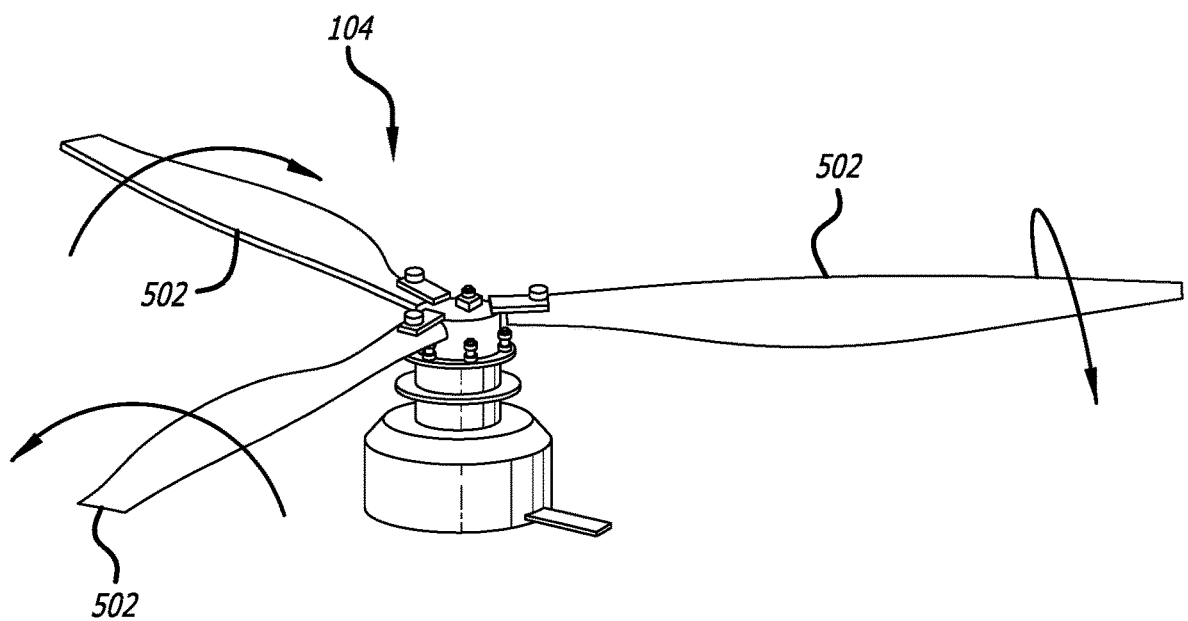
FIG. 5 is an isometric view of a rotor depicting the variable pitch propeller according to at least one example.

According to an aspect of the present disclosure, the propellers 104 may include blades 502 that are configured with adjustable pitch (e.g., angle), as depicted in FIG. 5 where each blade 502 can adjust in the direction of the arrows, and then be rotated back to the depicted positions. That is, a multicopter aircraft 102 of the present disclosure may include one or more mechanisms to adjust the pitch of the propeller blades 502 across a range of positions. The ability to adjust the blade pitch can enable the propellers 104 to maintain optimum efficiency of the propeller 104 across a wide combination of airspeeds (ranging from stationary hover to significant lateral, forward, and/or vertical velocity) and propeller axis orientation (e.g., propeller angle of attack in tilt-adjustable propellers 104) with respect to airspeed. The ability to adjust the blade pitch can also enable the propellers 104 to introduce differential pitch between overlapping propellers (either fully or partially overlapping) and/or sets of propellers to achieve increased efficiency in light of interactions between their flow fields.

Various configurations for pitch adjust mechanisms may be employed to vary the pitch of propeller blades 502 for a propeller 104. FIG. 6 is a cross-sectioned isometric view of a propeller 104 with an example of a pitch adjust mechanism for varying the pitch of the blades 502, according to at least one embodiment with the blades 502 in a lowest angle of attack position, and FIG. 7 is a similar view showing the blades 502 in a highest angle of attack position. As shown in the depicted example, the propeller 104 includes a speed adjust mechanism embodied as a motor 602 coupled to the propeller blades 502 to rotate the blades and generate thrust. The pitch adjust mechanism for adjusting the pitch of the blades 502 includes a non-rotating stationary plate 604 configured to be moved up and down in the direction of arrow 606. The stationary plate 604 can be coupled to a rod or other linkage component that is mechanically actuated up and down to adjust the location of the stationary plate 604. The stationary plate 604 can be coupled to a rotary bearing 608 positioned between the stationary plate 604 and a rotating plate 610. The rotating plate 610 can be coupled to a drive system, such that the rotating plate 610 can rotate with the propeller 104 during operation. Additionally, a clamp 612 that holds a respective propeller blade 502 in position is movably coupled to the drive system, and a linkage 614 is connected between the rotating plate 610 and the clamp 612.

In operation, the stationary plate 604 can be displaced up and down. As depicted in FIGS. 6 through 9, when the stationary plate 604 is displaced up or down, the rotating plate 610 also moves, causing the linkage 614 to push up or pull down the side of the clamp 612 to which it is connected. When the linkage 614 pushes up on the side of the clamp 612 to which it is coupled, the clamp 612 rotates, causing the blade 502 to also rotate. This rotation increases the angle of attack of the blade 502. Similarly, when the linkage 614 pulls down on the side of the clamp 612 to which it is coupled, the clamp 612 rotates in the opposite direction, causing the blade 502 to also rotate. This second or opposite rotation decreases the angle of attack of the blade 502.

According to an aspect of the present disclosure, a multicopter aircraft 102 can be configured to adjust the blade pitch of one or more propellers 104 in response to a tilt of one or more propellers 104. For example, when considering the state depicted in FIG. 4, the propellers 104 are tilted to provide maximum thrust for forward motion. As a result, the fore propellers 104 will experience an air velocity of about the speed of the multicopter aircraft 102, while the aft propellers 104 will be in an airstream that is accelerated by the front propellers 104 as depicted in FIG. 10. In response to the different airspeeds at the different propellers 104, the multicopter aircraft 102 of the present disclosure can adjust the pitch of propellers 104 based, for example, on the airspeed of the multicopter aircraft 102 and/or to provide a pitch difference between the fore and aft sets of propellers 104 to account for the air acceleration of the fore propellers 104.

At the other extreme of operation, when the multicopter aircraft 102 is hovering and the propellers are tilted for downward thrust, such as in the example depicted in FIG. 3, the multicopter aircraft 102 can set a blade pitch for all of the propellers 104 that is at least substantially identical in pitch and thrust, with no significant difference in pitch from front to back propellers 104 and with the pitch set to a relatively shallow angle.

This concept can be extended to a multicopter aircraft 102 with multiple layers of propellers 104, as depicted in FIG. 11, or even to any arbitrary number of propellers in any arbitrary pattern. For example, the multicopter aircraft 102 depicted in FIG. 11 may be characterized as two multicopter aircrafts 102 from FIG. 1 positioned one above the other. In this configuration, during hover depicted in FIG. 12, the lower set of four propellers 104 can be more aggressively pitched than the upper propellers 104 for maximum efficiency. That is, the pitch for the lower set of four propellers 104 can be adjusted to a more aggressive pitch compared to the upper propellers 104, in response to the increased speed of air passing through the lower set of propellers 104.

As the eight sets of propellers 104 tilt forward, the difference in pitch requirement now shifts from a top-bottom differential to a fore-aft differential. For example, FIGS. 13 and 14 are side views of the multicopter aircraft 102 from FIG. 11, showing examples of different tilts to the propellers 104. As shown in FIG. 13, the propellers 104 on the left side of the multicopter aircraft 102 may be adjusted to have a more aggressive pitch in response to the increased speed of the air coming from the propellers 104 on the right side of the image. Similarly, as the propellers 104 are tilted even further, as shown in FIG. 14, the pitch of the propellers 104 on the left side of the image can be increased to an even more aggressive pitch to accommodate for increase high-velocity airflow from the propellers 104 on the right side of the multicopter aircraft 102 in the image.

Adjusting the pitch of the blades 502 for one or more propellers 104 is described above as being based on the tilt of the propellers 104. However, in various embodiments, the pitch of the blades 502 may be adjusted even for embodiments where the propellers 104 may not be configured with variable tilt. In general, the pitch of the blades 502 for one or more propellers 104 can be adjusted based on airflow overlap between two or more different propellers 104. That is, the pitch of the blades 502 may be selected in response to airflow from at least one propeller 104 influencing the airflow at one or more other propellers 104, whether that is a result of tilt, the positioning of the various propellers 104 or a combination of the two. For example, the pitch of the blades 502 may be selected based on one or more of the speed of air entering a propeller 104 from an airspeed vector of the aircraft, the speed of air entering a propeller 104 after exiting at least one leading propeller 104, a change in pressure of air exiting a propeller 104 as a result of the exiting air subsequently entering a trailing propeller 104, a speed of the surrounding air, the direction of the surrounding air, and/or a turbulent condition of the surrounding air.

The pitch of the blades 502 for one or more propellers 104 can be controlled by mechanical and/or electrical means. As discussed above, an example of a pitch adjust mechanism for adjusting the pitch was set forth. In some embodiments, a cam system can be operably connected to the stationary plates 604 for each propeller 104, where a stationary plate 604 is adjusted up or down by movement of the cam in response to a change in tilt of one or more propellers 104. In some embodiments, the adjustment of the stationary plates 604 can be actuated by electronic means controlled by a processing system coupled to the frame 106 of the various embodiments of multicopter aircraft 102.

FIG. 15 is a block diagram illustrating select components of a multicopter aircraft 1500 employing a processing system 1502 according to at least one example of the present disclosure. In this example, the processing system 1502 is implemented with a bus architecture, represented generally by the bus 1504. The bus 1504 may include any number of interconnecting buses and bridges depending on the specific application of the processing system 1502 and the overall design constraints. The bus 1504 communicatively couples together various circuits including one or more processors (represented generally by the processing circuit 1506), a memory 1508, and computer-readable media (represented generally by the storage medium 1510). The bus 1504 may also link various other circuits such as timing sources, peripherals, voltage regulators, and power management circuits, which are well known in the art, and therefore, will not be described any further. A bus interface 1512 provides an interface between the bus 1504 and a tilt adjust mechanism 1514, a pitch adjust mechanism 1516, a speed adjust mechanism 1518, and/or an onboard sensor 1520. In one or more embodiments, a user interface (e.g., keypad, display, touchscreen, etc.) may also be utilized.

The tilt adjust mechanism 1514 may be employed to vary the tilt of each propeller (e.g., propeller 104) and/or sets of propellers. As noted above with reference to FIG. 2, embodiments of the tilt adjust mechanism(s) 1514 may include a servo motor, a linkage system, a hydraulic piston, etc. An example of a pitch adjust mechanism 1516 is described herein with reference to FIGS. 6 and 7. As noted herein, the pitch adjust mechanism described with reference to FIGS. 6 and 7 may include a cam system operably connected to the stationary plates 604 for each propeller 104, where a stationary plate 604 is adjusted up or down by movement of the cam in response to a change in tilt of one or more propellers 104. In some embodiments, the adjustment of the stationary plates 604 can be actuated by electronic means. Further, an example of a speed adjust mechanism 1518 may include a motor (e.g., motor 602 in FIGS. 6 and 7).

Referring still to FIG. 15, the processing circuit 1506 is responsible for managing the bus 1504 and general processing, including the execution of programming stored on the computer-readable storage medium 1510. The programming, when executed by the processing circuit 1506, causes the processing system 1502 to perform the various functions described below for any particular apparatus. The computer-readable storage medium 1510 and the memory 1508 may also be used for storing data that is manipulated by the processing circuit 1506 when executing programming. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1506 is arranged to obtain, process and/or send data, control data access and storage, issue commands, and control other desired operations. The processing circuit 1506 may include circuitry adapted to implement desired programming provided by appropriate media, and/or circuitry adapted to perform one or more functions described in this disclosure. For example, the processing circuit 1506 may be implemented as one or more processors, one or more controllers, and/or other structure configured to execute executable programming and/or execute specific functions. Examples of the processing circuit 1506 may include a general purpose processor, a digital signal processor (DSP), an application specific integrated circuit (ASIC), a field programmable gate array (FPGA) and/or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1506 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1506 are for illustration and other suitable configurations within the scope of the present disclosure are also contemplated.

In some instances, the processing circuit 1506 may include a flight control circuit and/or module 1522, and a propeller control circuit and/or module 1524. The flight control circuit/module 1522 may generally include circuitry and/or programming (e.g., programming stored on the storage medium 1510) adapted to control the flight of the multicopter aircraft 1500. The propeller control circuit/module 1524 may generally include circuitry and/or programming (e.g., programming stored on the storage medium 1510) adapted to adjust the rotational speed of one or more propellers (e.g., propellers 104), to adjust the tilt of one or more propellers as well as to identify a tilt position of the one or more propellers, and/or to adjust the pitch of blades for one or more propellers (e.g., blades 502 of propellers 104). As used herein, reference to circuitry and/or programming may be generally referred to as logic (e.g., logic gates and/or data structure logic).

The storage medium 1510 may represent one or more computer-readable devices for storing programming, such as processor executable code or instructions (e.g., software, firmware), electronic data, databases, or other digital information. The storage medium 1510 may also be used for storing data that is manipulated by the processing circuit 1506 when executing programming. The storage medium 1510 may be any available non-transitory media that can be accessed by a general purpose or special purpose processor, including portable or fixed storage devices, optical storage devices, and various other mediums capable of storing, containing and/or carrying programming. By way of example and not limitation, the storage medium 1510 may include a non-transitory computer-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 1510 may be coupled to the processing circuit 1506 such that the processing circuit 1506 can read information from, and write information to, the storage medium 1510. That is, the storage medium 1510 can be coupled to the processing circuit 1506 so that the storage medium 1510 is at least accessible by the processing circuit 1506, including examples where the storage medium 1510 is integral to the processing circuit 1506 and/or examples where the storage medium 1510 is separate from the processing circuit 1506 (e.g., resident in the processing system 1502, external to the processing system 1502, distributed across multiple entities).

Programming stored by the storage medium 1510, when executed by the processing circuit 1506, can cause the processing circuit 1506 to perform one or more of the various functions and/or process steps described herein. In at least some examples, the storage medium 1510 may include flight control operations 1526 and/or propeller control operations 1528. The flight control operations 1526 are generally adapted to cause the processing circuit 1506 to control the flight of the multicopter aircraft 1500, as described herein. The propeller control operations 1528 are generally adapted to cause the processing circuit 1506 to adjust the rotational speed of one or more propellers (e.g., propellers 104), to adjust the tilt of one or more propellers as well as to identify a tilt position of the one or more propellers, and/or to adjust the pitch of blades for one or more propellers (e.g., blades 502 of propellers 104), as described herein.

Thus, according to one or more aspects of the present disclosure, the processing circuit 1506 is adapted to perform (independently or in conjunction with the storage medium 1510) any or all of the processes, functions, steps and/or routines for any or all of the multicopter aircraft described herein (e.g., multicopter aircraft 102, multicopter aircraft 1500). As used herein, the term "adapted" in relation to the processing circuit 1506 may refer to the processing circuit 1506 being one or more of configured, employed, implemented, and/or programmed (in conjunction with the storage medium 1510) to perform a particular process, function, step and/or routine according to various features described herein.

In operation, the multicopter aircraft 1500 can control the tilt of one or more propellers as well as the pitch of the blades for one or more propellers based on one or more variables. In one example, the multicopter aircraft 1500 (e.g., the processing system 1502, tilt adjust mechanism 1514, pitch adjust mechanism 1516, and/or speed adjust mechanism 1518) can stabilize and control the multicopter aircraft 1500 by commanding a combination of one or more of the speeds of individual propellers and/or sets of propellers, tilt angle of individual propellers and/or sets of propellers, and pitch (blade angle) of individual propellers and/or sets of propellers. For example, FIG. 16 is a block diagram illustrating at least some logic associated with the multicopter aircraft 1500 for controlling various aspects of the propellers (e.g., propellers 104) according to at least one embodiment. Referring to FIGS. 15 and 16, the multicopter aircraft 1500 includes onboard sensors 1520, such as an inertial measurement unit 1602 that may include accelerometers and gyroscopes, as well as one or more additional sensors 1604. Information obtained from the one or more onboard sensors 1520 can be provided to the flight control circuit/module 1522.

The flight control circuit/module 1522 may include a state estimation circuit/module 1606 in which the state of the multicopter aircraft 1500 can be estimated based on the data received from the sensors 1520. Based on the current state estimation, altitude/position control circuit/module 1608 can determine the altitude and position of the multicopter aircraft 1500 compared to the desired altitude/position, and can calculate necessary adjustments.

Similarly, a velocity control circuit/module 1610 can determine the current estimated velocity and can generate commands to make adjustments to the velocity of the multicopter aircraft 1500. Furthermore, an attitude angle circuit/module 1612 and an attitude rate circuit/module 1614 can submit adjustments to the attitude angle and attitude rate based on current estimated attitude measurements compared to desired attitude angle and rate.

All of the submitted commands for adjusting respective aspects of the flight can be submitted to a mixer 1616, which then conveys respective command signals to one or more propeller control circuits/modules 1524 associated with one or more propeller sets. A propeller set depicted in FIG. 16 may refer to a single propeller or to a plurality of propellers. The control signals received by each propeller control circuit/module 1524 can be processed in a speed controller 1618, an actuator 1620, and/or a propeller pitch circuit/module 1622. The control signals processed by the speed controller 1618 can result in the speed controller 1618 adjusting the propeller speeds via the speed adjustment mechanism 1518 for one or more propellers based on the signals received. For example, the speed controller 1618 may increase, decrease, or leave unchanged a speed of speed adjustment mechanism 1518 (e.g., a motor) coupled with one or more propellers. Additionally, the control signals processed by the actuator 1620 can result in the actuator 1620 adjusting the tilt angles for one or more propellers via the tilt adjustment mechanism 1514. For example, the actuator 1620 may either electrically and/or mechanically actuate the tilt adjust mechanism 1514.

The control signals processed by the propeller pitch circuit/module 1622 may employ additional logic to determine whether to adjust a pitch of the blades for one or more propellers in response to airflow from at least one other propeller influencing an airflow at the one or more propellers. FIG. 17 is a block diagram illustrating at least some logic that may be associated with the propeller pitch circuit/module 1622 according to at least one example. As shown, the control signals from the mixer circuit/module 1616 or baseline blade pitch information can be received at the propeller pitch circuit/module 1622. In addition to the baseline blade pitch information or the received control signals, the propeller pitch circuit/module 1622 can also consider the propeller tilt 1702, the propeller axis of orientation with respect to airspeed 1704 (e.g., the propeller angle of attack), and the airspeed 1706. Additionally, as described above, the propeller pitch circuit/module 1622 can also consider the pitch of any leading blades 1708 by determining at decision diamond 1710 whether the propeller set is downstream to another propeller set. If it is not downstream to another propeller set, then no additional consideration is made regarding the final blade pitch. On the other hand, if the propeller set is downstream to another propeller set, then this information is utilized in considering the final blade pitch 1712 for the current propeller set.

Turning now to FIG. 18, a flow diagram is depicted of a method operational on an aircraft, such as the multicopter aircraft 1500, according to at least one implementation of the present disclosure. With reference to FIGS. 15-18, a multicopter aircraft 1500 can set a speed for a plurality of propellers at block 1802. For example, a speed adjustment mechanism 1518 may set a speed for a plurality of propellers. As noted herein, the speed adjustment mechanism 1518 may be a motor (e.g., motor 602 in FIG. 6) coupled to one or more propellers, where the motor can operate at various speeds. In one or more examples, the processing circuit 1506 may include logic (e.g., propeller control circuit/module 1524, speed controller 1618, propeller control operations 1528) operably coupled to the speed adjustment mechanism 1518 to adjust/set a speed of the propellers based on inputs from the flight control circuit/module 1522, as noted above with reference to FIG. 16.

At block 1804, the pitch of the plurality of blades of one or more propellers may be adjusted in response to airflow from at least one other propeller influencing the airflow at the one or more propellers. For example, the pitch of the blades (e.g., blades 502) may be adjusted in response to airflow from at least one propeller influencing the airflow at one or more other propellers, whether that is a result of tilt, the positioning of the various propellers or a combination of the two. In at least one example, the pitch of the blades may be adjusted based on one or more of the speed of air entering a propeller from an airspeed vector of the aircraft, the speed of air entering a propeller after exiting at least one leading propeller, a change in pressure of air exiting a propeller as a result of the exiting air subsequently entering a trailing propeller, a speed of the surrounding air, the flow direction of the surrounding air, and/or a turbulent condition of the surrounding air.

In at least one implementation, the processing circuit 1506 may include logic (e.g., propeller control circuit/module 1524, propeller pitch circuit/module 1622, propeller control operations 1528) operably coupled to the pitch adjust mechanism 1516 to adjust/set a pitch for the one or more propellers based on inputs from the flight control circuit/module 1522, as described above with reference to FIGS. 16 and 17. In at least one implementation, the multicopter aircraft 1500 may include a cam coupled to a tilt adjust mechanism and configured to adjust the pitch of the blades for the one or more propellers in response to tilt of the one or more propellers and/or tilt of one or more other propellers.

At block 1806, the multicopter aircraft 1500 may adjust the tilt of one or more of the propellers. For example, a tilt adjustment mechanism 1514 may set or adjust a tilt of one or more of the propellers. In at least one example, the processing circuit 1506 may include logic (e.g., propeller control circuit/module 1524, actuator 1620, propeller control operations 1528) operably coupled to the tilt adjustment mechanism 1514 to adjust/set a tilt of the propellers based on inputs from the flight control circuit/module 1522, as noted above with reference to FIG. 16.

One or more aspects described herein can be implemented in a multicopter aircraft to enable the ability to achieve relatively high speeds in one mode of operation, and to achieve relatively high hovering efficiency capable of heavy lifting in another mode of operation. These two modes have conventionally been considered mutually exclusive extremes, and one or more features described above can enable both modes in a single multicopter aircraft, as well as various arbitrary points in between these two extremes.

While the above discussed aspects, arrangements, and embodiments are discussed with specific details and particularity, one or more of the components, steps, features and/or functions illustrated in FIGS. 1, 2, 3, 4, 5, 6, 7, 8, 9, 10, 11, 12, 13, 14, 15, 16, 17, and/or 18 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 2, 3, 4, 5, 6, 7, 8, 9, 10, 11, 12, 13, 14, 15, 16, and/or 17 may be configured to perform or employ one or more of the methods, features, parameters, and/or steps described with reference to FIG. 18. The novel algorithms described herein may also be efficiently implemented in software and/or embedded in hardware.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. An aircraft, comprising:
a plurality of propellers, each propeller including a plurality of blades; and
at least one pitch adjust mechanism associated with at least one propeller, the at least one pitch adjust mechanism configured to adjust a pitch of the plurality of blades for at least one propeller in response to
an airspeed and a propeller axis of orientation with respect to the airspeed, wherein the pitch of the plurality of blades for at least one propeller is increased in response to an increase in airspeed and an increase in an angle of attack for the propeller axis of orientation with respect to the airspeed, and the pitch is decreased in response to a decrease in airspeed.

2. The aircraft of claim 1, further comprising:
a storage medium; and
a processing circuit coupled to the storage medium, the plurality of propellers and the at least one pitch adjust mechanism, the processing circuit adapted to:
adjust a pitch of the plurality of blades for at least one propeller utilizing the at least one pitch adjust mechanism.

3. The aircraft of claim 1, further comprising at least one tilt adjust mechanism associated with one or more respective propellers, the at least one tilt adjust mechanism configured to adjust a tilt of the one or more respective propellers.

4. The aircraft of claim 3, further comprising:
a storage medium; and
a processing circuit coupled to the storage medium, the plurality of propellers, the at least one tilt adjust mechanism, and the at least one pitch adjust mechanism, the processing circuit adapted to:
adjust a tilt of at least one propeller of the plurality of propellers utilizing the at least one tilt adjust mechanism; and
adjust a pitch of the plurality of blades for at least one propeller utilizing the at least one pitch adjust mechanism.

5. The aircraft of claim 3, wherein the at least one tilt adjust mechanism is configured to adjust the tilt of the one or more respective propellers to control a pitch of the aircraft independent of a propeller thrust vector for each of the one or more respective propellers.

6. The aircraft of claim 3, wherein the at least one tilt adjust mechanism is configured to adjust the tilt of the one or more respective propellers independent of a tilt of one or more other propellers.

7. The aircraft of claim 1, wherein the at least one pitch adjust mechanism is configured to adjust the pitch of the plurality of blades for the at least one propeller further in response to a tilt of a leading propeller that is upstream to the at least one propeller.

8. The aircraft of claim 1, wherein the at least one pitch adjust mechanism configured to adjust the pitch of the plurality of blades for the at least one propeller in response to an airspeed and a propeller axis of orientation with respect to the airspeed comprises the at least one pitch adjust mechanism configured to adjust the pitch of the plurality of blades for the at least one propeller in response to at least one of
a speed of air entering the at least one propeller from an airspeed vector of the aircraft,
a speed of air entering the at least one propeller after exiting at least one propeller leading the at least one propeller,
a change in pressure of air exiting the at least one propeller as a result of the air exiting the at least one propeller subsequently entering at least one propeller trailing the at least one propeller, or
at least one of a speed, direction, or turbulent condition of air surrounding the at least one propeller.

9. A method operational on an aircraft, comprising:
setting a speed for a plurality of propellers, each propeller including a plurality of blades; and
adjusting a pitch of the plurality of blades for at least one propeller in response to
an airspeed and a propeller axis of orientation with respect to the airspeed, wherein the pitch of the plurality of blades for the at least one propeller is increased in response to an increase in airspeed and an increase in an angle of attack for the propeller axis of orientation with respect to the airspeed, and the pitch is decreased in response to a decrease in airspeed.

10. The method of claim 9, further comprising adjusting a tilt of one or more respective propellers.

11. The method of claim 10, wherein adjusting the tilt of the one or more respective propellers comprises:
adjusting the tilt of the one or more respective propellers independent of a tilt of one or more other propellers.

12. The method of claim 10, wherein adjusting the tilt of the one or more respective propellers comprises:
adjusting the tilt of the one or more respective propellers to control a pitch of the aircraft independent of a propeller thrust vector for each of the one or more respective propellers.

13. The method of claim 9, wherein adjusting the pitch of the plurality of blades for at least one propeller comprises:
adjusting the pitch of the plurality of blades utilizing a pitch adjust mechanism.

14. The method of claim 9, wherein adjusting the pitch of the plurality of blades for at least one propeller in response to an airspeed and a propeller axis of orientation with respect to the airspeed comprises:
adjusting the pitch of the plurality of blades for at least one propeller further in response to at least one of
a speed of air entering the at least one propeller from an airspeed vector of the aircraft,
a speed of air entering the at least one propeller after exiting at least one propeller leading the at least one propeller,
a change in pressure of air exiting the at least one propeller as a result of the air exiting the at least one propeller subsequently entering at least one propeller trailing the at least one propeller, or
at least one of a speed, direction, or turbulent condition of air surrounding the at least one propeller.

15. A non-transitory processor-readable storage medium storing processor-executable programming for causing a processing circuit to:
set a speed for a plurality of propellers, each propeller including a plurality of blades; and
adjust a pitch of the plurality of blades for at least one propeller in response to
an airspeed and a propeller axis of orientation with respect to the airspeed, wherein the pitch of the plurality of blades for the at least one propeller is increased in response to an increase in airspeed and an increase in an angle of attack for the propeller axis of orientation with respect to the airspeed, and the pitch is decreased in response to a decrease in airspeed.

16. The processor-readable storage medium of claim 15, further comprising processor-executable programming for causing a processing circuit to:
adjust a tilt of the one or more respective propellers.

17. The processor-readable storage medium of claim 16, wherein the processor-executable programming for causing a processing circuit to adjust a tilt of the one or more respective propellers comprises processor-executable programming for causing a processing circuit to:
adjust the tilt of the one or more respective propellers utilizing at least one tilt adjust mechanism.

18. The processor-readable storage medium of claim 16, wherein the processor-executable programming for causing a processing circuit to adjust a tilt of the one or more respective propellers comprises processor-executable programming for causing a processing circuit to:

adjust the tilt of the one or more respective propellers to control a pitch of the aircraft independent of a propeller thrust vector for each of the one or more respective propellers.

19. The processor-readable storage medium of claim 16, wherein the processor-executable programming for causing a processing circuit to adjust a tilt of the one or more respective propellers comprises processor-executable programming for causing a processing circuit to:
  adjust the tilt of the one or more respective propellers independent of a tilt of one or more other propellers.

20. The processor-readable storage medium of claim 15, wherein the processor-executable programming for causing a processing circuit to adjust the pitch of the plurality of blades for at least one propeller in response to an airspeed and a propeller axis of orientation with respect to the airspeed comprises processor-executable programming for causing a processing circuit to:
  adjust the pitch of the plurality of blades for at least one propeller in response to at least one of
    a speed of air entering the at least one propeller from an airspeed vector of the aircraft,
    a speed of air entering the at least one propeller after exiting at least one propeller leading the at least one propeller,
    a change in pressure of air exiting the at least one propeller as a result of the air exiting the at least one propeller subsequently entering at least one propeller trailing the at least one propeller, or
    at least one of a speed, direction, or turbulent condition of air surrounding the at least one propeller.

* * * * *